Patented Feb. 19, 1929.

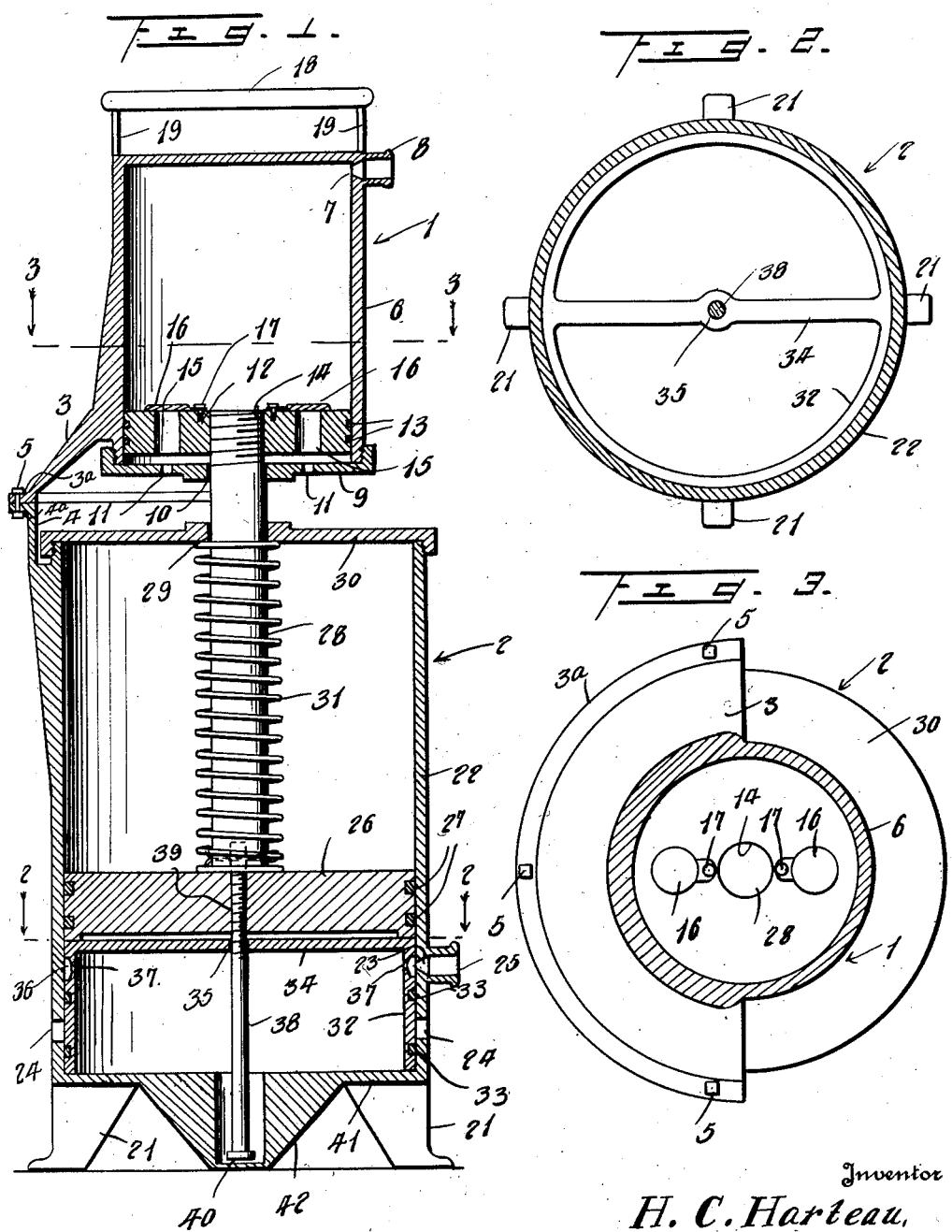

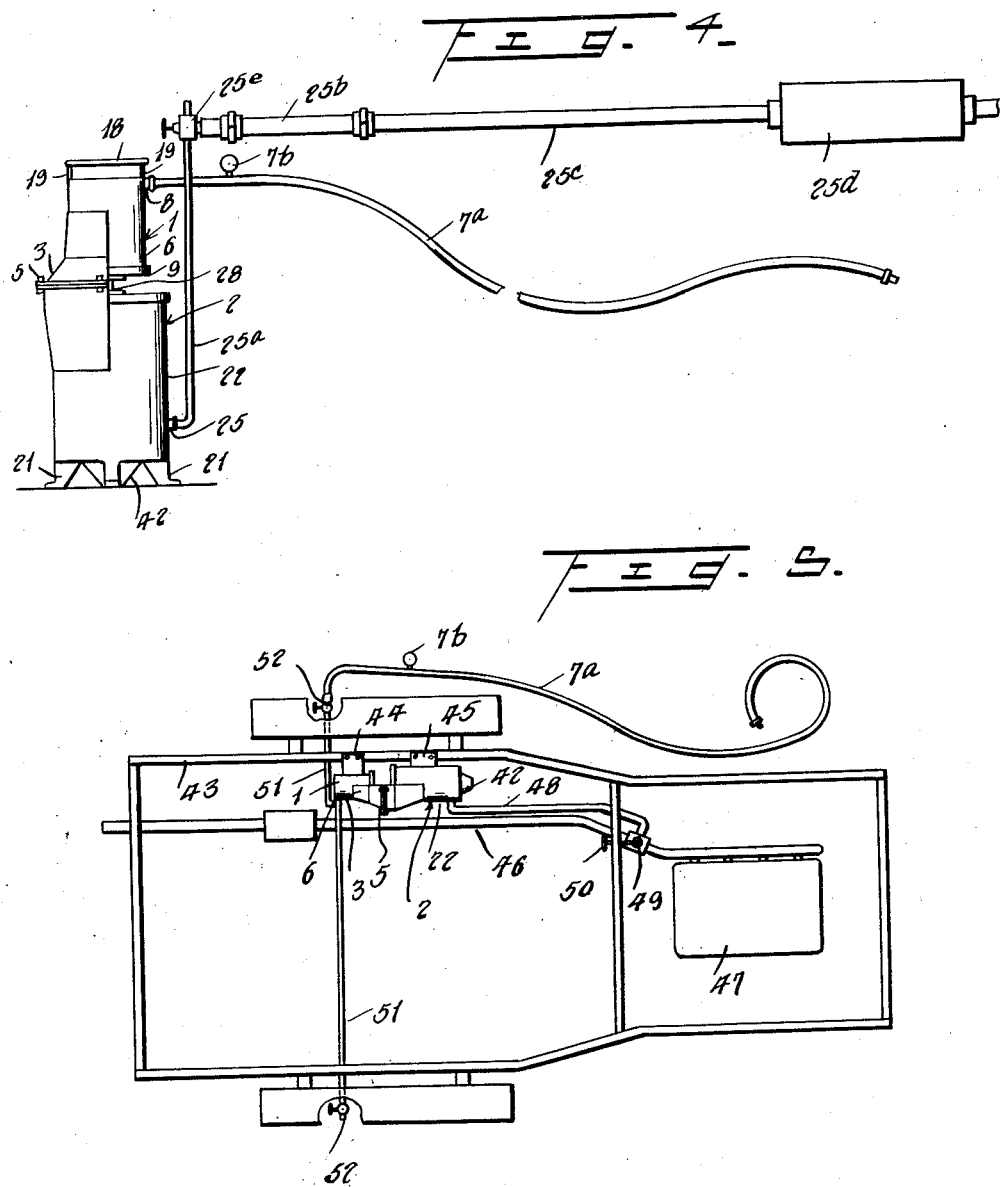

1,703,003

UNITED STATES PATENT OFFICE.

HARRY C. HARTEAU, OF IRON MOUNTAIN, MICHIGAN.

AIR PUMP AND ENGINE THEREFOR.

Application filed November 18, 1926. Serial No. 149,170.

This invention relates to an air pump, and has for one of its objects to provide a device of this character which shall be especially adapted to be used for the purpose of inflating pneumatic tires, and which shall embody an engine adapted to be operated by the exhaust gases of the engine of the automobile equipped with the tires being inflated.

A further object of the invention is to provide a device of the character stated which shall be of such size as to permit it to be stored in the tool compartment of the automobile, which shall be light in weight to permit it to be easily handled, and wherein the engine shall constitute the base or stand for the device when it is in use.

A still further object of the invention is to provide a device of the character stated which may if desired be secured to and between the side bars of the chassis of the automobile, which may be readily connected to the exhaust pipe of the automobile, and which shall be equipped with means adapted to control the flow of the exhaust gases to the engine thereof.

With the foregoing and other objects in view, the nature of which will become apparent as the description proceeds, the invention consists of the novel construction, combination and arrangement of parts hereinafter fully described and claimed, and illustrated in the accompanying drawings, wherein:

Figure 1 is a sectional view taken on a vertical plane extending centrally through the pump and engine therefor, Figure 2 is a transverse sectional view taken on the horizontal plane indicated by the line 2—2 of Figure 1, Figure 3 is a similar view taken on the horizontal plane indicated by the line 3—3 of Figure 1, Figure 4 is a view illustrating the manner in which the pump engine is connected to the exhaust pipe of an automobile engine, and Figure 5 is a top plan view of the manner in which the pump and engine may be connected to the chassis of an automobile and to the exhaust pipe of the automobile engine.

Corresponding and like parts are referred to in the following description, and designated in the several views of the accompanying drawings, by similar reference characters.

In the drawings, 1 designates the pump and 2 the engine of which the former is smaller than and mounted upon the latter. The connection between the pump 1 and engine 2 is established by means of a bracket flange 3 carried by the pump 1, a bracket flange 4 carried by the engine 2 and bolts 5 engaging the flanges 3 and 4. The bracket flange 3 which is of substantially semi-conical formation extends downwardly and outwardly from the lower end of the pump 1, and is provided at its lower edge with a horizontal extension 3ª. The bracket flange 4 which is of substantially semi-cylindrical formation extends laterally from the pump 2 and above the upper end thereof, and is provided at its upper edge with a horizontal extension 4ª. The flange extensions 3ª and 4ª abut, and the bolts 5 pass through the same.

The pump 1 comprises a cylinder 6 which is provided in its lateral wall at a point adjacent its upper end with a discharge port 7 which communicates with a coupling member 8. A hose 7ª provided with a pressure gauge 7ᵇ and adapted to be connected to the inflating valve of a pneumatic tire, is connected to the coupling 8. The lower end wall 9 of the cylinder 6 is in the form of a cap which has screw threaded connection with the cylinder and is provided with a central opening 10 and radially beyond the opening with intake ports 11. A piston 12 is reciprocably mounted in the cylinder 6, and is provided with packing rings 13. The piston 12 is provided with a central opening 14 of which the wall is screw threaded, and radially beyond said opening with openings 15 to permit air to pass by it during its down stroke. Flap valves 16 are secured to the upper side of the piston 12 by machine screws 17 and extend over the openings 15. The valves 16 function to close the openings 15 on the up stroke of the piston 12 and uncover the openings 15 on the down stroke of the piston 12. To permit the device to be readily handled a hand bar 18 is secured to the upper end of the cylinder 6. The hand bar 18 extends diametrically of the cylinder 6, and is secured to and spaced from the upper end thereof by arms 19.

The engine 2 constitutes the base or stand for the device, and is provided at its lower end with feet 21. The engine 2 comprises a cylinder 22 which is provided in its lateral wall adjacent its lower end with an intake port 23 and an exhaust port 24. The port 24 is arranged diametrically opposite each other, and the port 23 is located above the latter. A coupling 25 is secured to the lateral wall of the cylinder 22 about the intake port 23, and a tube 25ª is connected to the coupling 25 and to a tube 25ᵇ which latter is connected to the exhaust pipe 25ᶜ of an internal combustion engine rearwardly beyond the muffler 25ᵈ. A valve 25ᵉ provides means by which the amount of exhaust gases entering the engine 2 may be regulated and controlled. A solid reciprocating piston 26 is mounted in the cylinder 22, and is provided with packing rings 27. A rod 28 is secured to the upper side of the piston 26 and extends through a central opening 29 in the upper end wall 30 of the cylinder 22. The end wall 30 is in the form of a cap, and is removably secured to the cylinder 22. The piston rod 28 passes through the opening 10 in the lower end wall 9 of the cylinder 6 and has threaded engagement with the wall 14 of the piston 12. A coil spring 31 which is mounted upon the piston rod 28 between the piston 26 and end wall 30 of the cylinder 22, is adapted to be compressed during the upstroke of the piston 26 and is adapted to impart a down stroke to the piston 26. A hollow cylindrical valve 32 is reciprocably mounted in the cylinder 22 below the piston 26, and is fully open at its lower side and substantially open at the upper side. The valve 32 is provided with packing rings 33, and a bar 34 having a central opening 35 is secured to and extends diametrically across the upper side of the valve 32. When in its lowermost position within the cylinder 22, the valve 32 extends above the intake port 23 and exhaust port 24 and closes the latter port. An annular groove 36 formed in the outer side of the valve 32, and openings 37 formed in the valve 32 and registering with the groove 36, establish communication between the intake port 23 and the cylinder 22 when the valve 32 is in its lowermost position. The valve 32 is adapted to be raised from this position into a position where it will open the exhaust port 24 and close the intake port 23 by means of a rod 38 secured to and extending downwardly from the piston 26. The rod 38 has an adjustable threaded connection with the piston 26, as shown at 39, and passes through the opening 35 of the bar 34, and is provided at its lower end with a head 40 which contacts with the under side of the bar 34 immediately before the piston reaches the limit of its up stroke so as to effect the lifting of the valve during the remainder of such stroke and thus close the intake port 23 and open the exhaust port 24. During the down stroke of the piston 26, the rod 38 moves independently of the valve 32 and the valve is returned to its lowermost position by the piston 26. The rod 38 is greater in length than the altitude of the valve 32, and to receive the lower end of the rod 32 when the piston 26 and valve 32 are in their lowermost positions, the lower end wall 41 of the cylinder 22 is provided with a depending hollow projection 42.

In practice, the engine 2 is connected to the exhaust pipe of the engine of the automobile equipped with the tires to be inflated, and this is accomplished through the medium of the tubes connected to the discharge end of the exhaust pipe and to the coupling 25. With the parts of the device in the positions shown in Figure 1, the exhaust gases will flow into the cylinder 22 below the piston 26, with the result that an up stroke will be imparted to the piston 26. Immediately before the piston 26 reaches the limit of its up stroke, the head 40 of the rod 38 moves into contact with the under side of the bar 34, with the result that during the remainder of this stroke of the piston 26 the valve 32 is moved upwardly into a position where it will close the intake port 23 and open the exhaust port 24. The piston 26 is now spaced from the valve 32 and the spring 31 is under tension. As soon as the pressure below the piston 26 becomes less than that of the spring 31, by reason of the escape of the exhaust gases out through the port 24, the spring 31 will react and move the piston 26 downwardly with respect to the valve 32. Immediately before reaching the limit of its down stroke, the piston 26 will contact with the valve 32 and return the latter to its lowermost position so as to effect the opening of the intake port 23 and the closing of the exhaust port 24. It will thus be apparent that the piston 26 will be moved in one direction by the exhaust gases and in the opposite direction by the spring 31. The reciprocation of the piston 26 imparts a corresponding motion to the piston 12, with the result that air is drawn into the cylinder 6 through the inlet ports 11 and discharged therefrom through the exhaust port 7 which latter port is connected to the inflating valve of a pneumatic tire by the tube 7ª.

The device as described is portable and may when not in use be placed in the tool compartment of the automobile. If desired, the device may be secured to one of the side bars 43 of the chassis of an automobile as shown in Figure 5. When the device is to be secured to the chassis, it is not provided with a handle and legs, and to permit it to be secured in place the pump 1 is provided with ears 44 and the engine 2 with ears 45. The engine 2 is connected to the exhaust pipe 46 of the engine 47 of the automobile by a tube 48 which extends from said pipe to the intake port 23 of the engine 2. A valve 49 provides means by which the exhaust gases may be directed into the tube 47 when it is desired to use the pump, and this valve is adapted to be operated by a rod 50. In this application of the device, a pipe 51 extends from the discharge port 7 of the pump 1 and is provided with a valve 52, and the tube 7ª is secured to the end of the pipe.

It should be understood that the drawings are merely illustrative, and do not pretend to give exact proportions. Furthermore, the said drawings are illustrative of a preferred construction, it being my expectation that various changes and modifications may be made without departing from the spirit and scope of my invention.

What is claimed is:—

1. In combination, a cylinder provided with intake and exhaust ports of which the latter opens to the atmosphere, a piston, a valve slidably mounted in the cylinder for operation by the piston into a position to open the intake and close the exhaust port and into a position to close the intake and open the exhaust port, and means connecting the piston and valve to permit the piston to reciprocate in both directions for a limited distance with respect to the valve before moving it from one to the other of said positions, a pump operable by said piston, and spring means to urge the piston to normal position, and valve means carried by the pump to automatically open as the piston is moved by the spring means.

2. In combination, a cylinder provided in its lateral wall with intake and exhaust ports of which the latter opens to the atmosphere, a piston, a hollow cylindrical valve slidably mounted in the cylinder for operation by the piston into a position to open the intake and close the exhaust port and into a position to close the intake and open the exhaust port, a bar connected to and extending across the valve, a rod secured to the piston and connected to the bar for a limited slidable movement with respect thereto to permit the piston to reciprocate in both directions for a limited distance with respect to the valve before moving it from one to the other of said positions, a support for the cylinder, said support being hollow, and said rod extending into the hollow in the normal position of the parts.

3. In combination, a pump cylinder, an engine cylinder, the cylinders being arranged in axial alinement, a semi-conical flange and a semi-cylindrical flange integral with and extending axially beyond the proximate ends of the pump and engine cylinders, respectively, means engaging the flanges to detachably connect the cylinders, walls removably applied to said ends of the cylinders, said means being located outwardly of said walls, pistons in the cylinders, and a rod connecting the pistons and passing through said walls.

In testimony whereof I affix my signature.

HARRY C. HARTEAU.